(No Model.)
W. ATKINSON.
VEHICLE SPRING.
No. 483,505.    Patented Sept. 27, 1892.
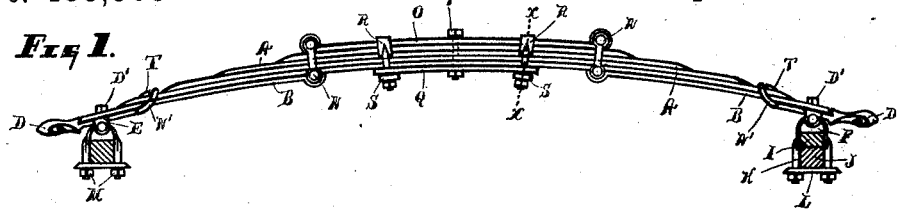
Fig 1.
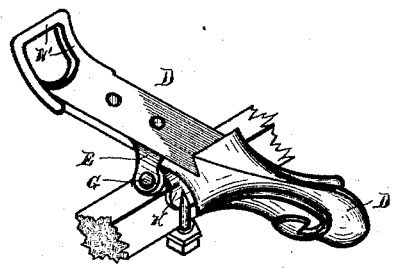
Fig 2.
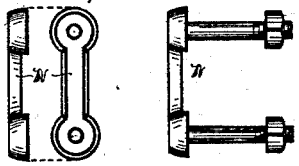
Fig 5.
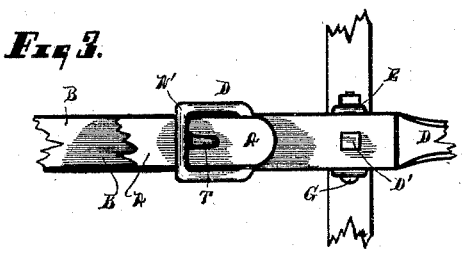
Fig 3.
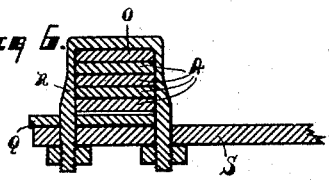
Fig 6.
Fig 4.
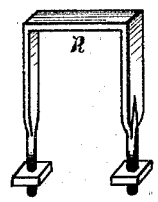
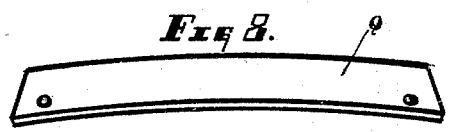
Fig 7.
Fig 8.
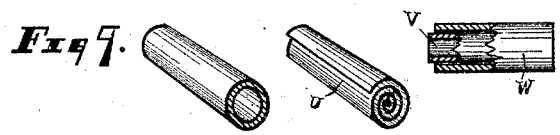
Fig 9.
Witnesses:
Edwin F. Hayner
H. J. Hayner
William Atkinson,
Inventor.
By Allen G. Ingalls
Attorney.

UNITED STATES PATENT OFFICE.

WILLIAM ATKINSON, OF GRANBY, CANADA, ASSIGNOR OF ONE-HALF TO CYRUS R. TOWER, OF SAME PLACE.

VEHICLE-SPRING.

SPECIFICATION forming part of Letters Patent No. 483,505, dated September 27, 1892.

Application filed December 16, 1891. Serial No. 415,308. (No model.)

*To all whom it may concern:*

Be it known that I, WILLIAM ATKINSON, a citizen of the United States, residing at Granby, in the county of Shefford, in the Province of Quebec, Canada, have invented certain new and useful Improvements in Vehicle-Springs, of which the following is a full, clear, and exact description.

Reference is to be had to the accompanying drawings, forming part of this specification, in which similar letters of reference indicate corresponding parts in all the figures.

Figure 1 is a side view in elevation of a spring having my improvements attached to the head-bar and rear axle-bed of a carriage. Fig. 2 shows the knuckle-piece with its looped end by means of which the spring is attached through both its ends to the axle-bed or head-bar of the vehicle in cases where the spring is placed longitudinally with the body of the vehicle or to any conveniently-adjacent parts of the construction, where the springs are placed transversely to the body of the vehicle, as in the case of road-carts, where the ends of the springs might be connected directly with the axle of the cart through the knuckle-pieces, such as shown in Figs. 2 and 3, or that of express-wagons or other such like vehicles, where end springs are ordinarily employed, said figure showing the part or member in perspective. Fig. 3 is a plan of the same. Figs. 4 and 5 are separate views of parts hereinafter referred to by letter. Fig. 6 is a sectional view on line $x\ x$. Fig. 7 shows the top tension-plate; Fig. 8, the rub-plate; and Fig. 9 is a plan with details referred to hereinafter.

The object of my invention is to provide a cheap, serviceable, and thoroughly-useful vehicle-spring, which may be incorporated with any road-vehicle and form a part of the same.

The invention consists in the construction and combination of the various parts of the device, as will be hereinafter fully described, and pointed out in the claims, and relates to that type or class of vehicle-springs in which some sort of tension and slide plates are combined to make with these springs an easy-riding vehicle. In all such springs as have been hitherto produced considerable difficulty has been encountered by reason of the rigidity or stiffness of the springs acting to wear out or destroy the parts of which they are formed or the pieces making the connections with the body or of the gearing of the vehicle in which they have been incorporated as a factor. In my patent of the United States, No. 455,603, issued July 7, 1891, such a spring is shown. This spring, as described and claimed in the specification and claims of the said patent, I have found to be inoperative and impracticable for the reasons which will more fully and at large appear on reference to the said patent and the invention therein claimed and comparison with the present, which objections and salient defects I have overcome by this my present invention, which, although designed for the same purpose as that of the invention shown and claimed in said patent, may be exactly substituted for it as an entirely-different invention. My first invention, covered by said patent, consisted in certain improvements in the springs of those vehicles only in which the springs are placed longitudinally with the body of the vehicle and was embodied in the device set forth in said patent, to which reference may be made merely in the sense of showing the advantages of my present perfected invention.

In the drawings forming a part of this present specification the spring-plates A are piled in the usual manner, and they are supported by the slide-plates B, which have secured to their ends by means of a bolt or rivet or otherwise, if preferred, the knuckle-pieces D. These knuckle-pieces are prolonged into the loop N and have formed on them the downward-projecting lugs E, which are pivoted to the block F by the bolt G, which passes through the blocks and through the lug E at each of its ends. The block F, axle-bed I, and axle J are all bound together by the screwed clip K, which lies in a groove formed in the sides and top of the block F and passes down through the binder L, where it is secured by the nuts. The inner ends of the slide-plates B are bent round a mandrel to form a cylindrical termination to the slide-plate, the longest diameter of the cylinder being at right angles to that of the plate, this cylindrical termination being so formed to receive the lower arm of the shackle N.

(Shown in Fig. 5.) The upper arm of these shackles passes through similarly-formed terminals in the ends of the top tension-plate O, which lies centrally on the top of the spring. Within the cylindrical terminals just described, through which the arms of the shackle pass, I arrange a bushing of any suitable material or method of construction. The essential idea of this bushing (see Fig. 9) is a spiral spring U, formed of thin steel answerable in width to the completed bushing and folded or rolled upon itself, so as to form the bushing with the central orifice large enough to allow the arm of the shackle to pass through it. This spring is then tempered. In practice I have found that such a bushing is not serviceable for the purpose intended, as it wears readily and is expensive; but I propose to use any bushing which will serve the purpose, whether a composite construction made up of such a spiral with a brass socket or of a socket of any composition shown at V as resting immediately around the arm of the shackle formed to loosely pass through a second larger socket W and having a spiral spring between the two, or composed of any springy and durable material whatsoever which will come nearest to a spiral steel spring and possessing the functional elements of such a spring, since this bushing is an essential feature in my invention, as will hereinafter appear. The end portions of the tension-plate O are sprung slightly away from the spring-plates A, so that while the shackle end is strained tightly between the slide-plates B and this plate, which with the assistance of the bushing prevents all rattling, it is allowed to swing freely, so as to admit of the necessary end-play in the up and down movements of the spring when in use. A bolt P passes down through the centers of the top tension-plate O, the spring-plates A, and the rub-plate Q and binds the whole firmly together. This rub-plate Q is made, preferably, of spring-steel and has its end portions turned downward and away from the bottom plate of the spring, so as to act as a tension to the clips R, by which the cross-bars S, which centrally connect the two springs of the vehicle together, are secured to the springs. The plate Q is considerably wider than the spring-plate, when desirable, as when the springs are to be used in vehicles where springs are placed longitudinally with the body of the vehicle, but need not be wider in other cases, as this plate Q is then no longer a rub-plate. The outer legs of the clips R pass through both the rub-plate and the cross-bars S or their equivalent; but the inner leg passes only through the cross-bars, and are thus held firmly in place. Upon the longest leaf of the spring-plates A, I form the stop T, which will be so placed as to be beyond the top of the loop termination of the knuckle-piece B, and with the loop forms an effectual stop when the reflex movement of the spring will have carried it back to its normal curve. By this arrangement of the stop T, combined to act functionally with the loop N of the knuckle-piece D, it is plain that if the bolt D should become broken or loosened so that the nut would fall off then and in that case the spring would not be released from the chair-rest formed by the loop and notch in the knuckle-piece, since this loop N comes across and down the sides of the spring and will hold it down till such time as the user of the vehicle may reach a blacksmith-shop and have a new bolt put in. In the case of my first invention, covered by Patent No. 455,603, should this bolt D or the rivets therein mentioned be broken then the spring would be straightened out, leave the coupling, and the wagon-box would drop down, giving its occupant a serious jolt. With this present invention no such accident could happen, since the loop N of the knuckle-piece would still hold the construction integrally in position after the bolt D' would have broken. The function of the plate Q is that it would cease to act relatively to its downwardly-curved ends if the bolt D or its nut should drop accidentally out of place, by reason of which intimately-close functional connection between the loop N of the knuckle-piece D, the stop T, and the plate Q they together form a combined result, which is of the essence of my present invention.

I have found the stop T necessary even if there were no accident to the bolt D, since the shackle end of the rub-plate forms a loose joint with the top plate O and would not prevent the whole body of the wagon when side springs of this sort are used from shifting forward whenever an obstacle were met within the roadway; or if one side spring should move forward the wagon-body would lie diagonally across the gearing. So, also, if the body were to be hung below the top level of the spring damage would be done to it through the wrench caused by striking an obstacle, since the wagon-body would be thrown directly against the inner side of the spring, and, although in the old construction neither the bolt P nor the clips R could be broken as a result of the breaking of the end bolt D, still, since the spring at that end would leave the knuckle-piece B in the event of such an accident, the same resultant effect would ensue as though the bolt P and clips R were broken, because the springs would leave the knuckle-piece just where one of the end bolts D' was broken and the occupant be thrown out and the whole construction dismantled. The remaining leaves of the spring other than the lowest in which the stop T is formed have no function, except as accessories to the first leaf, and they serve to stiffen the spring. Such leaves are old, have long been known, and are in general use. The spring-leaf bearing the stop T, however, is so essential an element in the invention as to have its influence felt throughout the whole construction, as I have found by practical experience. The tension-plate O acts with the bottom plate Q, the shackles N, and the slide-plate B to retard the reflex motion of the spring when bent downward by the impact of the vehicle against an obstacle by reason of the friction between the side plate and the bottom leaf of the spring, and because of the springiness of this bottom plate Q and the fact of its being formed and tempered upon the sweep of a smaller circle than that of the spring proper. Thus when the spring is integrally depressed by the impact, calling the leaves of the spring proper into play, as well as the plate O, the slide-plates advance at their inner end because the lowest leaf of the spring in straightening with the other leaves advances its ends outwardly toward the knuckle-piece. In this connection my loop and stop T are called radically into place, for when the reflex motion brings the spring up and back to its normal curve and the loop serves to stop any further motion by reason of the protuberance T coming directly in contact with the loop no upward motion beyond the normal level is felt by the occupant of the vehicle, since the force of the reflex of the spring is lost in the spring itself because of the functional connection between the loop, the stop, the shackle, and the top and bottom plates. This result, also, has been demonstrated by practical tests as not being capable of being produced in the old construction.

One salient feature of the invention, and which incorporates the elements into an integral combination of elements, is the bushing above explained. These are introduced into the joints of the shackle and around the bolts G. The value of these bushings becomes apparent when the springs are in use. They make an easier motion in flexion and reflexion of the springs than could be otherwise experienced by the occupant of the vehicle. They cause a joint to play easier than they would if iron were built against iron or steel against steel. By my invention of the stop T and the loop N' of the knuckle-piece B constructions embodying my present spring can be produced much more cheaply than those embodying my former inventions above referred to. The stop T costs one-thirtieth of that of the clips or lugs used in the other invention. It was found by experiment that these lugs require to be welded into the leaf of the spring, whereby the original vitality of the steel as rolled out was almost lost through the welding heat necessary to the process and that only the most skilled mechanics could properly form and weld these lugs, whereas in my present invention the steel is merely heated to redness and a swedge used to punch the stop T into the steel with a blow from an ordinary hammer, and if the danger of overheating the steel in welding were eliminated by riveting these lugs onto the leaf of the spring an unsatisfactory and inartistic result would be produced which at best would have neither strength nor durability.

In my present invention no holes whatever are made in the steel of the leaf of the spring, except that for the reception of the bolt P, which is reinforced by the clips R, and that for the knuckle-bolt D', so that even in drilling no lessening of the initial strength of the spring is caused. This spring, embodying my invention, neither lengthens nor shortens when in use, and it may be employed on all classes of vehicles, such as road-carts, express-wagons, buggies, and the like, whereas the other was suitable only to that class where the springs are placed longitudinally with the body of the vehicle.

Springs constructed as above described combine great strength with extreme pliability, permit the carriage-body to be hung low, and make a light, easy-riding, and well-equalized vehicle.

Having thus fully described my invention, I claim as new and desire to secure by Letters Patent—

1. In a vehicle-spring, the knuckle-pieces D, rigidly secured to the slide-plates of the spring and having the lugs E, the said knuckle-piece prolonged into a loop to inclose the end of the spring and to act with its stop T, the bolt G, passing through the said lugs and pivoting them to the blocks F, and the clips K, binder L, and nuts M, substantially as herein shown and described.

2. The combination, in the vehicle-spring, of the cylindrical terminals of the tension-plate O, suitably secured to the spring and the bottom plate Q, said terminals being bushed, substantially as shown and described, and acting through the shackle-arms with the bushings of the cylindrical terminals of the rub-plates B, with the stop or protuberance T of the lowest leaf of the spring, and the loop-terminal of the knuckle-piece D, forming a chair-rest with the said spring-leaf and the rub-plate by passing across the top and down the sides of the said spring-leaf and rub-plate, as set forth.

3. In a vehicle-spring, the combination, with the knuckle-piece D, suitably secured to the relatively-adjacent parts of the vehicles, having its looped terminal N to clasp the rub-plate B and the lowest leaf of the spring bearing the protuberance T and to produce with said protuberance of the spring an effectual stop, substantially as and for the purposes set forth.

4. The combination, in a vehicle-spring, of the stop T of the spring-leaf with the looped terminal N of the knuckle-piece, as set forth.

5. In a vehicle-spring, the combination of the loop N of the knuckle-piece D with the stop T of the lowest spring-leaf and the plate Q, as set forth.

6. In a vehicle-spring, the combination, with the stop T of the spring-leaf resting upon the rub-plate B and into the loop N of the knuckle-piece D, of the plate O, acted upon by said stop T and loop N through the shackle R and preventing the body of the vehicle from shifting forward, substantially as set forth.

7. In a vehicle-spring, the combination of the loop N of the knuckle-piece with the stop T, the shackle N, the top plate O, and the bottom plate Q, arranged to act functionally together, as set forth.

8. In a carriage-spring, the combination of the bushing, substantially as hereinbefore shown and described, with the cylindrical terminals of the top tension-plate O, the bottom tension-plate Q, and the arms of the shackle N, and the bolt G, whereby a more delicate and exact functional action of the spring is produced, as set forth.

WILLIAM ATKINSON.

In presence of—
  I. L. DOZOIS,
  P. A. L'ECUYER.